(12) United States Patent
Godbillon

(10) Patent No.: US 9,682,647 B2
(45) Date of Patent: Jun. 20, 2017

(54) MODULE FORMING A BODYWORK ELEMENT FOR MOTOR VEHICLES CONTRIBUTING TO THE EXTERIOR AESTHETICS OF THE VEHICLE

(71) Applicant: Valeo Vision, Bobigny (FR)

(72) Inventor: Vincent Godbillon, Paris (FR)

(73) Assignee: Valeo Vision, Bobigny (FR)

(*) Notice: Subject to any disclaimer, the term of this patent is extended or adjusted under 35 U.S.C. 154(b) by 23 days.

(21) Appl. No.: 14/792,852

(22) Filed: Jul. 7, 2015

(65) Prior Publication Data
US 2016/0009221 A1    Jan. 14, 2016

(30) Foreign Application Priority Data
Jul. 9, 2014  (FR) ..................... 14 56624

(51) Int. Cl.
| | | |
|---|---|---|
| B60Q 3/04 | (2006.01) | |
| B60Q 1/00 | (2006.01) | |
| B60Q 1/26 | (2006.01) | |
| B60Q 1/30 | (2006.01) | |
| B60Q 3/64 | (2017.01) | |
| B60Q 3/208 | (2017.01) | |
| B62D 25/06 | (2006.01) | |

(52) U.S. Cl.
CPC ......... *B60Q 1/0035* (2013.01); *B60Q 1/0041* (2013.01); *B60Q 1/2611* (2013.01); *B60Q 1/302* (2013.01); *B60Q 3/208* (2017.02); *B60Q 3/64* (2017.02); *B62D 25/06* (2013.01)

(58) Field of Classification Search
CPC ... B60Q 3/0203; B60Q 3/0279; B60Q 3/0293
USPC ........................................ 362/543, 544, 545
See application file for complete search history.

(56) References Cited

U.S. PATENT DOCUMENTS

| | | | | |
|---|---|---|---|---|
| 4,896,136 | A * | 1/1990 | Hotovy ............... | B60Q 3/0279 340/468 |
| 5,884,997 | A * | 3/1999 | Stanuch et al. ...... | B60Q 1/2611 340/472 |
| 6,402,354 | B1* | 6/2002 | Tatewaki et al. ...... | B60Q 3/001 362/234 |
| 7,097,225 | B2 | 8/2006 | Huisingh et al. | |
| 7,798,565 | B2 | 9/2010 | Johl et al. | |
| 2005/0258663 | A1 | 11/2005 | Huisingh et al. | |
| 2007/0035161 | A1 | 2/2007 | Huisingh et al. | |
| 2008/0303315 | A1 | 12/2008 | Johl et al. | |

FOREIGN PATENT DOCUMENTS

| | | |
|---|---|---|
| EP | 1852312 A1 | 11/2007 |
| WO | 2004020249 A2 | 3/2004 |

* cited by examiner

*Primary Examiner* — Vip Patel
(74) *Attorney, Agent, or Firm* — Jacox, Meckstroth & Jenkins

(57) ABSTRACT

A module forms a bodywork element for a motor vehicle and contributes to the exterior aesthetics of the vehicle. It is intended to fitted to a body of the vehicle. It includes interior lighting electrical means, intended to light the interior of a passenger compartment of the vehicle, and means for connecting the interior lighting means to an electrical power supply.

18 Claims, 2 Drawing Sheets

MODULE FORMING A BODYWORK ELEMENT FOR MOTOR VEHICLES CONTRIBUTING TO THE EXTERIOR AESTHETICS OF THE VEHICLE

CROSS-REFERENCE TO RELATED APPLICATIONS

This application claims priority to the French application 1456624 filed Jul. 9, 2014, which application is incorporated herein by reference and made a part hereof.

BACKGROUND OF THE INVENTION

1. Field of the Invention

The present invention concerns the technical fields of lighting and signaling systems for motor vehicles and bodywork elements for motor vehicles. The invention more particularly concerns a module forming a bodywork element for motor vehicles contributing to the exterior aesthetics of the vehicle and intended to be fitted to a body of the vehicle.

2. Description of the Related Art

A motor vehicle generally includes a plurality of lighting and signaling means having various functions. For example, a front optical unit of the motor vehicle has the main functions of illuminating the road and of making the vehicle visible to vehicles traveling in the opposite direction in an adjacent lane, notably at night and during inclement weather. A rear stop light of the vehicle enables information to be sent to drivers of other vehicles, such as to indicate braking. Interior lighting makes it possible to light the interior of the passenger compartment of the vehicle, notably at night.

It is known to produce these lighting and signaling means separately and to install them in the body of the vehicle. These means must then be connected separately to a common battery of the vehicle. The operations of fitting and connecting the lighting and signaling means represent a constraint for the operative or the machine carrying them out because they must be carried out inside the body of the vehicle. This defines a relatively confined space to which access is difficult and the walls of which may impede the movements of the operative or the machine. These operations are therefore uncomfortable for an operative and complex joints must be provided in the case of a machine to enable it to move inside the body, which represents an additional cost and additional complexity in terms of controlling the machine. The fitting and connection operations are therefore time consuming and tiresome and each connection operation constitutes a risk of a wrong connection.

SUMMARY OF THE INVENTION

An object of the invention is to render the fitting of at least some lighting and signaling means in a motor vehicle simpler, faster and more reliable.

To this end, the invention provides a module forming a bodywork element for a motor vehicle, this module contributing to the exterior aesthetics of the vehicle and being intended to be fitted to a body of the vehicle, wherein it includes interior lighting electrical means, intended to light the interior of a passenger compartment of the vehicle, and means for connecting the interior lighting means to an electrical power supply.

The interior lighting electrical means can therefore be installed in the module before fitting the module to a motor vehicle body, which avoids having to carry out this installation inside the body of the vehicle. This therefore avoids having to make certain tiresome and complicated connections inside the body of the vehicle.

Moreover, after fitting the module to the body of the vehicle, it suffices to connect the connecting means of the module to an electrical power supply of the vehicle, which makes it possible to reduce the time to install the interior lighting electrical means of the vehicle, to avoid the risk of wrong connections, and to improve the reliability of the connection of the module to the electrical power supply of the vehicle. Moreover, the interior lighting electrical means of the vehicle being incorporated into a bodywork element formed by the module, it is therefore possible to reduce the number of elements of the vehicle to be assembled on a complete vehicle production line.

The bodywork element advantageously forms at least part of a roof of the vehicle.

This choice is beneficial because the interior lighting electrical means of a motor vehicle are generally situated in the vicinity of the roof of the vehicle.

The module advantageously further includes exterior lighting or exterior signaling electrical means, intended to light the exterior of the vehicle or to participate in signaling by the vehicle.

This therefore reduces the number of separate lighting and signaling means and therefore the number of fitting and connecting operations to be effected inside the body of the vehicle. The effect of this is to reduce the time needed to fit the lighting and signaling means in the vehicle and the risk of wrong connection of these means to the electrical power supply of the vehicle.

The module advantageously includes at least two compartments in which are respectively housed on the one hand the interior lighting means and on the other hand the exterior lighting or exterior signaling means, these two compartments being separated by a partition formed, where appropriate, by a printed circuit board connected to the interior lighting means and/or to the exterior lighting or exterior signaling means.

This therefore ensures that the interior lighting means and the exterior lighting or exterior signaling means do not interfere with one another, which could generate harmful light pollution.

The exterior lighting or exterior signaling means advantageously include an optical system forming a headlamp of the vehicle.

The exterior lighting or exterior signaling means advantageously include an optical system forming a rear light of the vehicle.

The exterior lighting or exterior signaling means advantageously include an optical system forming a center highmount stop lamp of the vehicle.

The module therefore includes many of the various lighting and signaling means that a motor vehicle generally includes, which makes it possible to reduce the time to install the lighting and signaling means in the body of the vehicle and the risk of wrong connections.

The module advantageously further includes at least part of a vehicle windshield aperture.

The module advantageously further includes at least part of a pillar of at least one of the front windshield, rear window and windows of the vehicle.

The module advantageously further includes least one of the following:

an interior rearview mirror of the vehicle, an exterior rearview mirror of the vehicle, a windshield wiper, preferably with means for driving the windshield wiper, a radio reception antenna, a video camera, a sensor, and a decorative covering.

This therefore further reduces the number of elements of the vehicle to be fitted separately into the body of the vehicle.

The module advantageously further includes means for connection to data communication means, for example a controller area network (CAN) or local interconnect network (LIN) type data communication bus.

The module therefore also includes communication means enabling the conveyance of information relating to the control of the lighting and signaling means.

These and other objects and advantages of the invention will be apparent from the following description, the accompanying drawings and the appended claims.

BRIEF DESCRIPTION OF THE ACCOMPANYING DRAWINGS

The invention will be better understood on reading the following description given by way of example only and with reference to the drawings, in which.

DETAILED DESCRIPTION OF THE PREFERRED EMBODIMENTS

The following description relates to the frame of reference of a motor vehicle 2 with a Cartesian systems of axes R(O, x, y, z) in which O is the central point of the volume defined by the vehicle 2, the axis (Ox) corresponds to the main axis of the vehicle 2 and to the direction X, the axis (Oy) corresponds to the horizontal direction perpendicular to the main axis of the vehicle 2 and to the direction Y, and the axis (Oz) is the vertical at the present location and corresponds to the direction Z.

Figure 1:
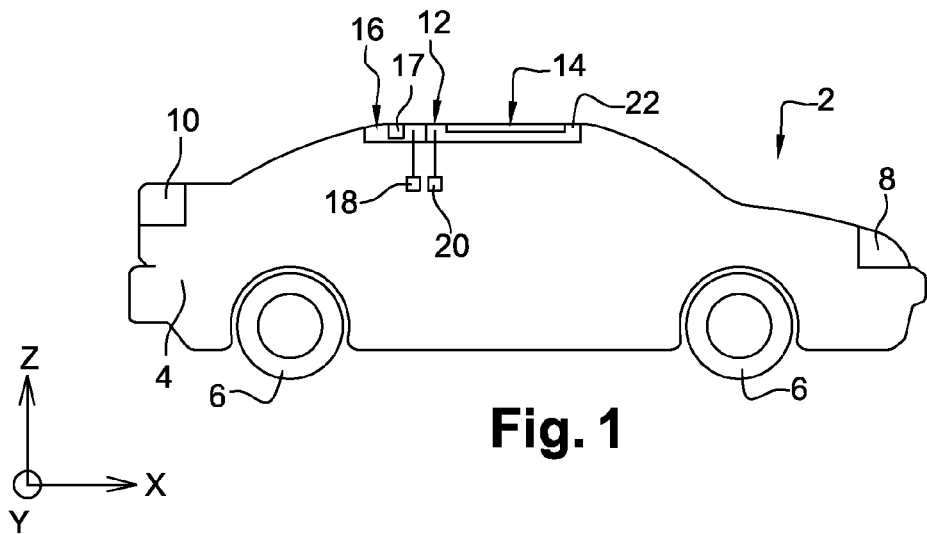
FIG. 1 is a side view of a motor vehicle is fitted with a module in accordance with a first embodiment.
Figure 2:
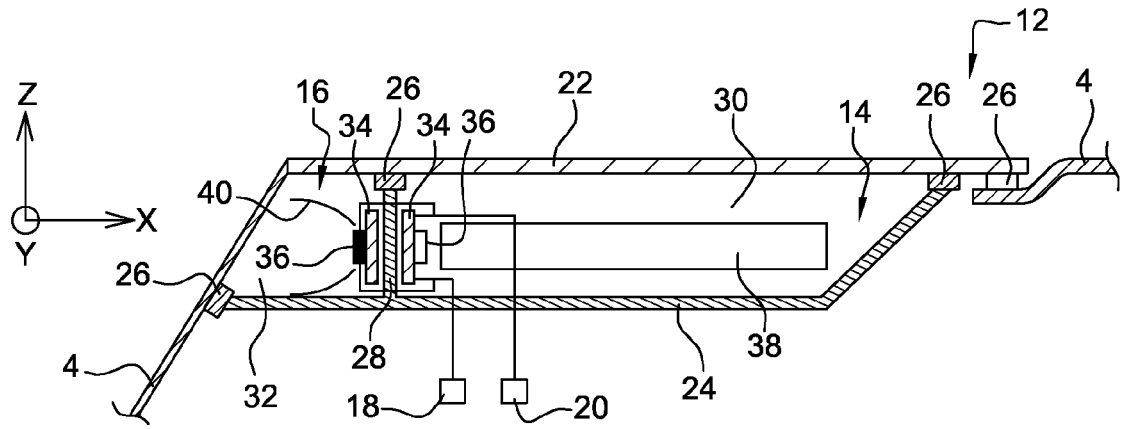
FIG. 2 is a view in longitudinal section of the module shown in FIG. 1.
Figure 3:
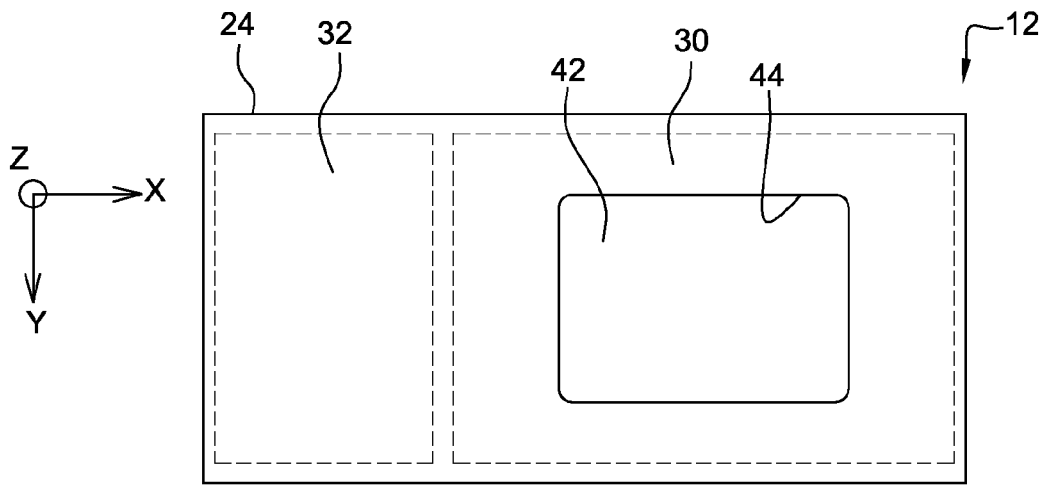
FIG. 3 is a bottom view of the module shown in FIG. 2.

Referring to FIGS. 1 to 3, the vehicle 2 includes a body 4, wheels 6, front optical units 8 and rear lights 10.

A module 12 in accordance with a first embodiment of the invention is fitted to the body 4 of the vehicle 2. This module 12 includes interior lighting electrical means 14 intended to light the interior of a passenger compartment of the vehicle 2 and exterior lighting or exterior signaling electrical means 16 here including a center high-mount stop lamp (CHMSL) 17. It will emerge hereinafter how the interior lighting function and the exterior lighting or exterior signaling function are implemented.

The module 12 also includes connection means 18 for connecting the interior lighting electrical means 14 and the exterior lighting or exterior signaling means 16 to an electrical power supply (not shown). The battery of the vehicle 2 may constitute the electrical power supply of the module 12, for example, but the vehicle 2 may include an electrical power supply that is specifically dedicated to the module 12 or the module 12 may even include an electrical power supply that is dedicated to it. The function of the connection means 18 is to supply electrical energy to the interior lighting electrical means 14 and the exterior lighting or exterior signaling means 16.

The module 12 also includes connection means 20 to data communication means (not shown), for example a controller area network (CAN) or local interconnect network (LIN) type data communication bus. The function of the data communication means is to control activation and deactivation of the interior lighting electrical means 14 and the exterior lighting or exterior signaling means 16 of the module 12 when predetermined events occur, such as braking or opening a door of the vehicle 2, for example.

Considering the module 12 in its configuration when fitted to the vehicle 2, this module 12 includes an upper wall 22 covering a lower body 24.

In the example shown, the upper wall 22 forms the roof or at least part of the roof of the vehicle 2 and therefore contributes to the exterior aesthetics of the vehicle 2. The upper wall 22 may be partly or even entirely glazed. The lower body 24 forms at least part of a ceiling of the passenger compartment.

The module 12 is assembled separately from the vehicle 2, in other words it forms a whole that can be manufactured at a location different from the place at which the module 12 is fitted to the vehicle 2.

The module 12 is shown in more detail in FIGS. 2 and 3. When the module 12 is fitted to the vehicle 2, the roof or upper wall 22 and the ceiling or lower body 24 are at least in part substantially parallel to a plane perpendicular to the direction Z. The roof or upper wall 22, the ceiling or lower body 24 and the body 4 of the vehicle 2 are connected to one another by conventional fixing means 26. These fixing means 26 may be demountable or not.

The lower body 24 includes a partition 28 extending at least in part substantially parallel to the plane (Oyz). This partition 28 separates the interior volume of the module 12 into first and second compartments 30, 32. One edge of this partition 28 is connected to the roof or upper wall 22 via fixing means 26.

The first compartment 30, located farther to the front of the vehicle 2 than the second compartment 32 relative to the direction of movement of the vehicle 2, includes a printed circuit board (PCB) 34 to which is connected a light source 36, here consisting of a light-emitting diode. The first compartment 30 also includes an optical diffuser system 38 placed in front of the light source 36, intended to receive light emitted by the light source 36 and to re-emit it in the direction of the passenger compartment of the vehicle 2. In one embodiment, the optical diffuser system 38 may be formed by a conventional light guide, for example, of the tubular or surface type, for example. The first compartment 30 therefore includes the elements forming the interior lighting electrical means 14 of the vehicle 2.

The second compartment 32 also includes the PCB 34 to which is connected the light source 36. An optical projection system 40, including a reflector, for example, is placed in front of the light source 36. This optical projection system 40 is intended to project light emitted by the light source 36 toward the rear of the vehicle 2. The second compartment 32 therefore includes elements forming the exterior lighting or exterior signaling means 16 of the vehicle 2.

In FIG. 3, the first and second compartments 30, 32 of the module 12 are shown in dashed outline. The ceiling or lower body 24 includes an opening 42 delimited by a contour 44 intended to allow light transmitted by the optical diffuser system 38 to pass through it. A glazing panel, possibly frosted, may be housed in this opening 42.

The module 12 therefore includes the first and second compartments 30, 32 in which are respectively housed the interior lighting electrical means 14 on the one hand and the exterior lighting or exterior signaling means 16 on the other hand, these two compartments 30, 32 being separated by the partition 28.

The module 12 is fitted to the vehicle 2 as follows: the module 12 is positioned on the body 4 of the vehicle 2, the connection means 18 are connected to the power supply of the vehicle 2, the connection means 20 are connected to the data communication means, and the module 12 is fixed to the vehicle 2 using the fixing means 26. It is therefore clear that fitting the module 12 is particularly simple and fast, notably because most of the operations of fitting and connecting the interior lighting electrical means 14 and the exterior lighting or exterior signaling means 16 are carried out outside the body 4 of the vehicle 2, during pre-assembly of the module 12. The risk of wrong connections is further limited thanks to the smaller number of connection means 18, 20 that simply have to be connected to the electrical power supply and to the data communication means of the vehicle 2.

Figure 4:
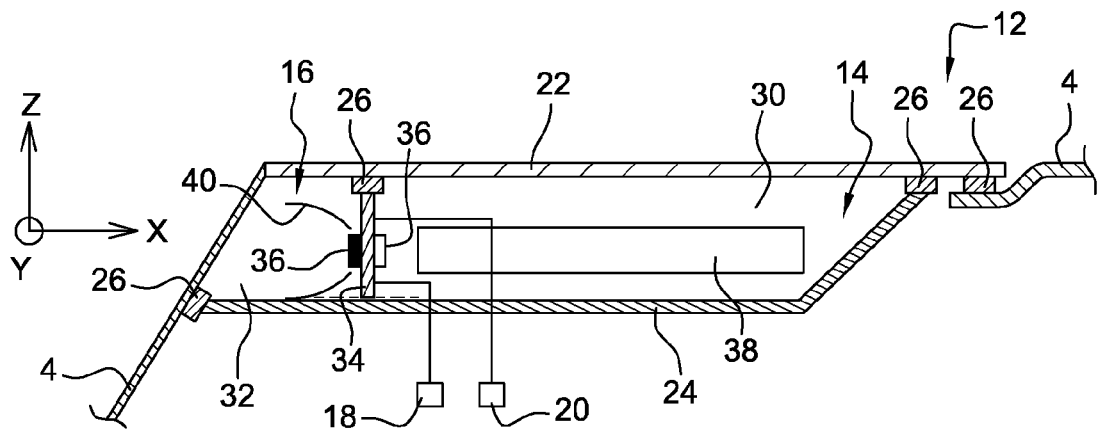
FIG. 4 is a view in longitudinal section of a variant of the module shown in FIG. 2.

FIG. 4 shows a variant of the module shown in FIG. 2, which differs from the latter in that the first and second compartments 30, 32 of the module 12 are separated by a single PCB 34 connected to the interior lighting electrical means 14 and to the exterior lighting or exterior signaling means 16. Two light sources 36 are connected to the PCB 34, on respective opposites side thereof.

Figure 5:
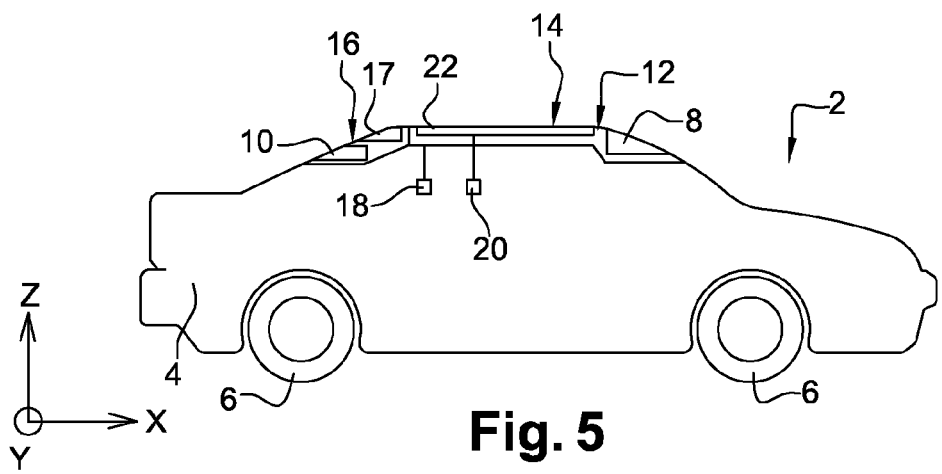
FIGS. 5 and 6 are side views of a motor vehicle fitted with a module in accordance with second and third embodiments of the invention.

FIG. 5 shows a motor vehicle 2 fitted with a module 12 in accordance with a second embodiment of the invention differing from the first embodiment in that the module 12 further includes the front optical units 8 and the rear lights 10 of the vehicle 2. The module 12 therefore includes exterior lighting electrical means and exterior signaling electrical means intended to light the exterior of the vehicle 2 and to contribute to signaling by the vehicle 2.

Figure 6:
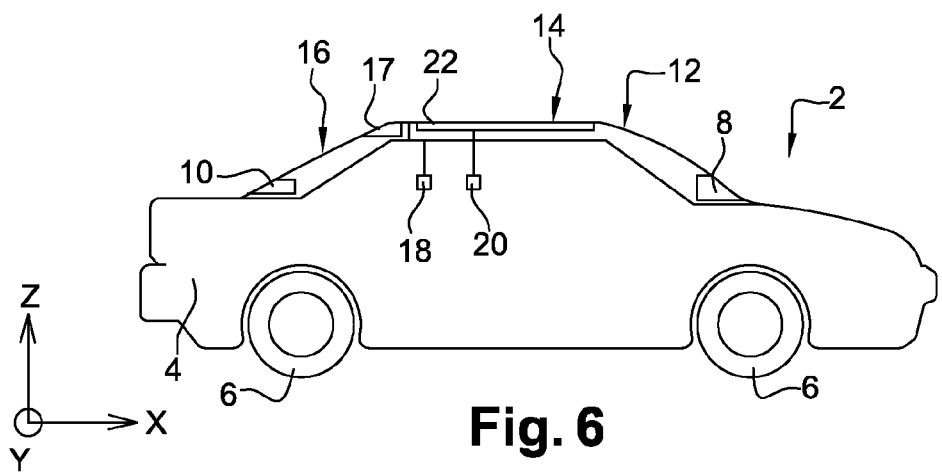

FIG. 6 shows a motor vehicle 2 fitted with a module 12 in accordance with a third embodiment of the invention, which differs from the second embodiment in that the module 12 further includes part of a vehicle window opening and at least part of a pillar of at least one of a front windshield, a rear window and windows of the vehicle 2. The volume of this module 12 being greater than those in the first and second embodiments, a more flexible arrangement of the exterior lighting or exterior signaling means 16 is possible. Accordingly, the module 12 may also include other elements (not shown to clarify the figures) selected from:
an interior rearview mirror of the vehicle 2,
an exterior rearview mirror of the vehicle 2,
a windshield wiper preferably with means for driving the windshield wiper,
a radio reception antenna,
a video camera,
a sensor, and
a decorative covering for the ceiling or lower body 24.

Of course, numerous modifications could be made to the invention without departing from the scope thereof.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A module forming a bodywork element for a motor vehicle, said module contributing to the exterior aesthetics of said motor vehicle and being intended to be fitted to a body of said motor vehicle, wherein said module comprises:
interior lighting electrical means for lighting an interior of a passenger compartment of said motor vehicle, and
means for connecting said interior lighting electrical means to an electrical power supply;
wherein at least a portion of said module forms at least part of a bodywork of said motor vehicle;
said module further comprising exterior lighting or exterior signaling electrical means for lighting an exterior of said motor vehicle or to participate in signaling by said motor vehicle;
said module further comprising means for connection to data communication means comprising at least one of a controller area network (CAN) or a local interconnect network (LIN) type data communication bus.

2. The module according claim 1, wherein said bodywork element forms at least part of a roof of said motor vehicle.

3. The module according to claim 1, including at least two compartments in which are respectively housed on the one hand, said interior lighting electrical means and on the other hand, said exterior lighting or exterior signaling means, said at least two compartments being separated by a partition formed, where appropriate, by a printed circuit board connected to said interior lighting electrical means and/or to said exterior lighting or exterior signaling means.

4. The module according to claim 3, wherein said exterior lighting or exterior signaling means include an optical system forming a headlamp of said motor vehicle.

5. The module according to claim 3 wherein said exterior lighting or exterior signaling means include an optical system forming a rear light of said motor vehicle.

6. The module according to claim 3, wherein said exterior lighting or exterior signaling means include an optical system forming a center high-mount stop lamp of said motor vehicle.

7. The module according to claim 3, further including at least part of a vehicle window aperture.

8. The module according to claim 1, wherein said exterior lighting or exterior signaling means include an optical system forming a headlamp of said motor vehicle.

9. The module according to claim 8, wherein said exterior lighting or exterior signaling means include an optical system forming a rear light of said motor vehicle.

10. The module according to claim 8, wherein said exterior lighting or exterior signaling means include an optical system forming a center high-mount stop lamp of said motor vehicle.

11. The module according to claim 8, further including at least part of a vehicle window aperture.

12. The module according to claim 1, wherein said exterior lighting or exterior signaling means include an optical system forming a rear light of said motor vehicle.

13. The module according to claim 12, wherein said exterior lighting or exterior signaling means include an optical system forming a center high-mount stop lamp of said motor vehicle.

14. The module according to claim 1, wherein said exterior lighting or exterior signaling means include an optical system forming a center high-mount stop lamp of said motor vehicle.

15. The module according to claim 1, further including at least part of a vehicle window aperture.

16. The module according to claim 1, further including at least part of a pillar of at least one of a front windshield, a rear window and windows of said motor vehicle.

17. The module according to claim 1, further including at least one of the following:
- an interior rearview mirror of said motor vehicle;
- an exterior rearview mirror of said motor vehicle;
- a windshield wiper, preferably with means for driving the windshield wiper;
- a radio reception antenna;
- a video camera;
- a sensor; and
- a decorative covering.

18. A module forming a bodywork element for a motor vehicle, said module contributing to the exterior aesthetics of said motor vehicle and being intended to be fitted to a body of said motor vehicle, wherein said module comprises:
- an internal lighting system for lighting an interior of a passenger compartment of said motor vehicle, and
- a connector for connecting said internal lighting system to an electrical power supply;
- wherein at least a portion of said module forms at least part of a bodywork of said motor vehicle;
- said module further comprising exterior lighting or exterior signaling electrical means for lighting an exterior of said motor vehicle or to participate in signaling by said motor vehicle;
- said module further comprising means for connection to data communication means comprising at least one of a controller area network (CAN) or a local interconnect network (LIN) type data communication bus.

* * * * *